(12) United States Patent
Thomas et al.

(10) Patent No.: US 12,484,482 B2
(45) Date of Patent: Dec. 2, 2025

(54) CROP RAMP WITH BELT GUIDE ROLLER FOR A HEADER OF AN AGRICULTURAL HARVESTER

(71) Applicant: CNH Industrial America LLC, New Holland, PA (US)

(72) Inventors: Jeffrey Thomas, Gordonville, PA (US); Collin Wenstrom, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 650 days.

(21) Appl. No.: 17/899,192

(22) Filed: Aug. 30, 2022

(65) Prior Publication Data
US 2024/0065165 A1    Feb. 29, 2024

(51) Int. Cl.
| A01D 57/26 | (2006.01) |
| A01D 34/04 | (2006.01) |
| A01D 57/00 | (2006.01) |
| A01D 57/20 | (2006.01) |
| A01D 61/02 | (2006.01) |

(52) U.S. Cl.
CPC ............. *A01D 57/26* (2013.01); *A01D 34/04* (2013.01); *A01D 61/02* (2013.01)

(58) Field of Classification Search
CPC ........ A01D 57/26; A01D 57/00; A01D 57/20; A01D 61/008; A01D 41/1252; A01D 41/14; A01D 61/02
See application file for complete search history.

(56) References Cited

U.S. PATENT DOCUMENTS

| 8,065,865 | B1 * | 11/2011 | Dow ...................... A01D 57/20 56/181 |
| 10,264,728 | B2 | 4/2019 | Brimeyer |
| 2012/0042617 | A1 * | 2/2012 | Dow .................... A01D 61/002 56/153 |
| 2015/0000240 | A1 * | 1/2015 | Sethi ...................... A01D 57/00 56/181 |
| 2020/0375107 | A1 * | 12/2020 | Duerksen ................ A01D 57/20 |
| 2021/0360855 | A1 * | 11/2021 | Thomas ............. B65G 21/2081 |

FOREIGN PATENT DOCUMENTS

| EP | 0098227 B1 | 1/1986 |
| EP | 887007 A1 * | 12/1998 ............. A01D 34/86 |

* cited by examiner

*Primary Examiner* — Kristen C Hayes
(74) *Attorney, Agent, or Firm* — Buchanan Ingersoll & Rooney PC

(57) ABSTRACT

A crop ramp for a header of an agricultural harvester including a curved plate having an outer surface over which cut crop passes and an inner surface. The crop ramp further includes a roller support extending rearwardly from the curved plate and a roller supported for rotation by the roller support. The roller has an outer circumferential surface configured to be contacted by a fore edge of an upper run of an endless belt draper conveyor in order maintain tracking of the conveyor and eliminate contact between the conveyor and the interior of the crop ramp.

18 Claims, 4 Drawing Sheets

CROP RAMP WITH BELT GUIDE ROLLER FOR A HEADER OF AN AGRICULTURAL HARVESTER

The exemplary embodiments of the present invention relate generally to a header of an agricultural harvester having crop ramps with belt guide rollers.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they flow over crop ramps whereupon they are collected inside the header and transported via a conveyor such as a draper conveyor and/or auger conveyor towards a feederhouse located centrally inside the header.

Conventional agricultural harvester headers often include opposed lateral draper conveyors, i.e., endless belt conveyors, extending widthwise of the header that deliver cut crop to a central draper conveyor extending in the fore and aft direction of the header which delivers cut crop received from the lateral draper conveyors to the feederhouse. In operation, the lateral draper conveyors are normally sloped forwardly and downwardly whereby the fore edge of at least their upper runs oftentimes contacts the inner surfaces of the crop ramps thereby causing friction and wear of the conveyors and the crop ramps as the conveyors move past the crop ramps. As a consequence of such wear and tear, the draper belts and/or crop ramps require frequent maintenance or replacement, whereby their service lives are substantially less than optimum.

SUMMARY OF THE INVENTION

In accordance with an exemplary embodiment, the present disclosure provides a crop ramp for a header of an agricultural harvester. The crop ramp comprises a curved plate having an outer surface and an inner surface, a roller support extending rearwardly from the curved plate, and a roller supported for rotation by the roller support. The roller has an outer circumferential surface configured to be contacted by a fore edge of an upper run of an endless belt draper conveyor in order maintain tracking of the conveyor and eliminate contact between the conveyor and the interior of the crop ramp.

In accordance with another exemplary embodiment, the present disclosure provides a header for an agricultural harvester. The header comprises an endless belt conveyor having a fore edge and supported for movement on the header. The header further comprises a cutter bar and a crop ramp disposed between the cutter bar and the endless belt conveyor. The crop ramp includes a curved plate having an outer surface and an inner surface, a roller support extending rearwardly from the curved plate, and a roller supported for rotation by the roller support.

Other features and advantages of the subject disclosure will be apparent from the following more detailed description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the subject disclosure is not limited to the precise arrangements and instrumentalities shown. In the drawings.

DETAILED DESCRIPTION OF THE DRAWINGS

Figure 1:
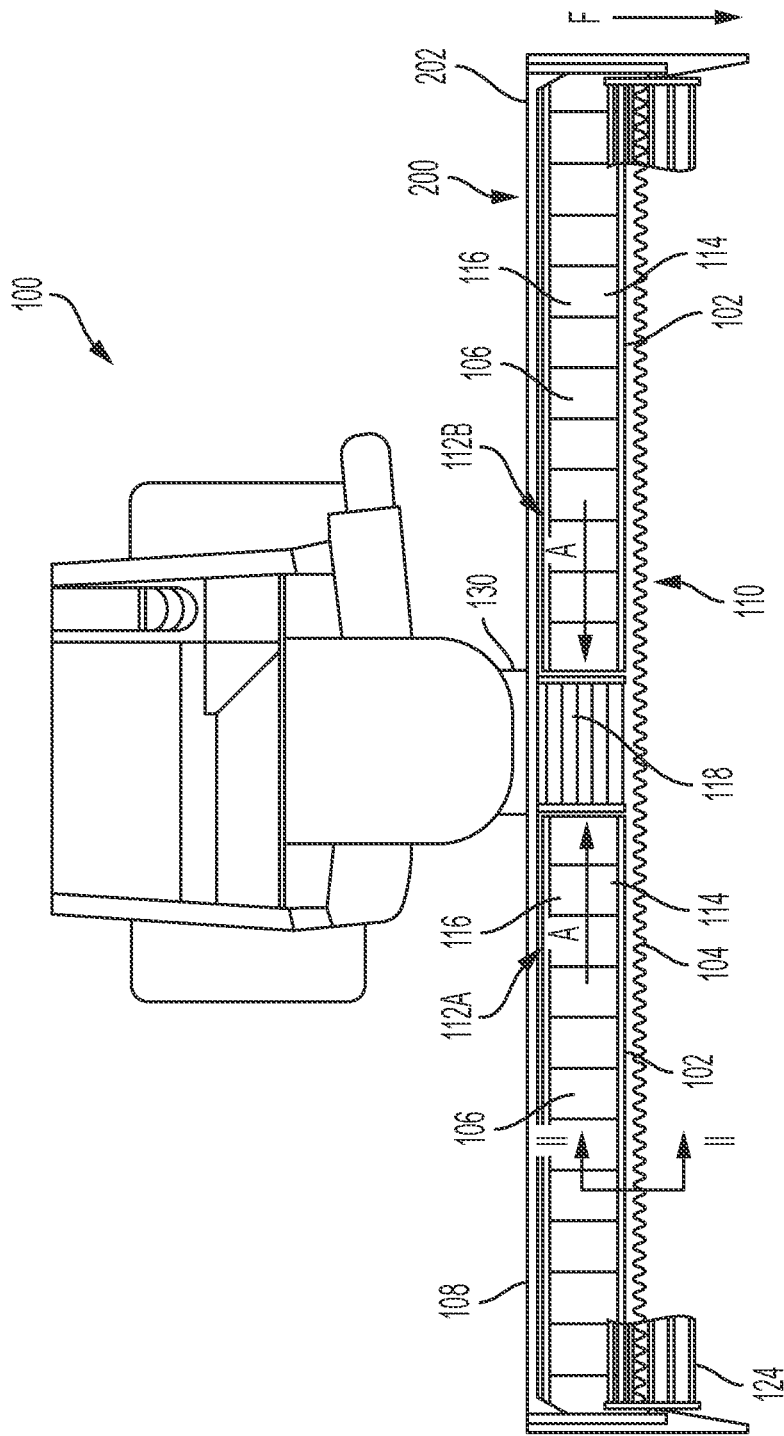
FIG. 1 is a top plan view of an agricultural harvester including a header equipped with a crop ramp in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring to FIG. 1, a representative agricultural harvester 100, which, e.g., may be a combine harvester, is shown. The harvester includes a draper header 200 incorporating a cut crop barrier interface or crop ramp 102 according to the subject disclosure disposed between an elongate sidewardly extending cutter bar 104 and an elongate, sidewardly extending, endless belt draper conveyor 106 of the header 200.

The header 200 comprises a frame 202, a portion of which is shown extending forwardly from a rear support frame structure 108 to the cutter bar 104. The frame 202 can have a variety of forms, but will generally comprise a chassis-like structure for supporting an elongate sidewardly extending cutter bar assembly 110 comprising the cutter bar 104, as well as at least one elongate sidewardly extending draper assembly 112 comprising the draper conveyor 106, and other aspects of the header.

As illustrated, the header 200 includes two draper assemblies 112A, 112B operable for conveying cut crop convergingly to a central conveyor 118, as generally denoted by arrows A, as the harvester moves in a forward direction denoted by arrow F through a field while cutting the crops. The central conveyor 118, in turn, conveys the cut crop into a feederhouse 130 of the harvester 100, which conveys the crop into the harvester for threshing and separation of crop therefrom.

The cutter bar assembly 110 generally includes a sideward, longitudinally extending knife guard having a plurality of forward projecting fingers. The cutter bar assembly 110 carries an elongate sickle comprised of knife sections 123 (FIG. 2) which are sidewardly reciprocated through and relative to the fingers for cutting crop as the harvester moves in forward direction F. A reel 124 extends across the header just above cutter bar assembly 110, and operates to feed the crop to the cutter bar for cutting.

Figure 2:
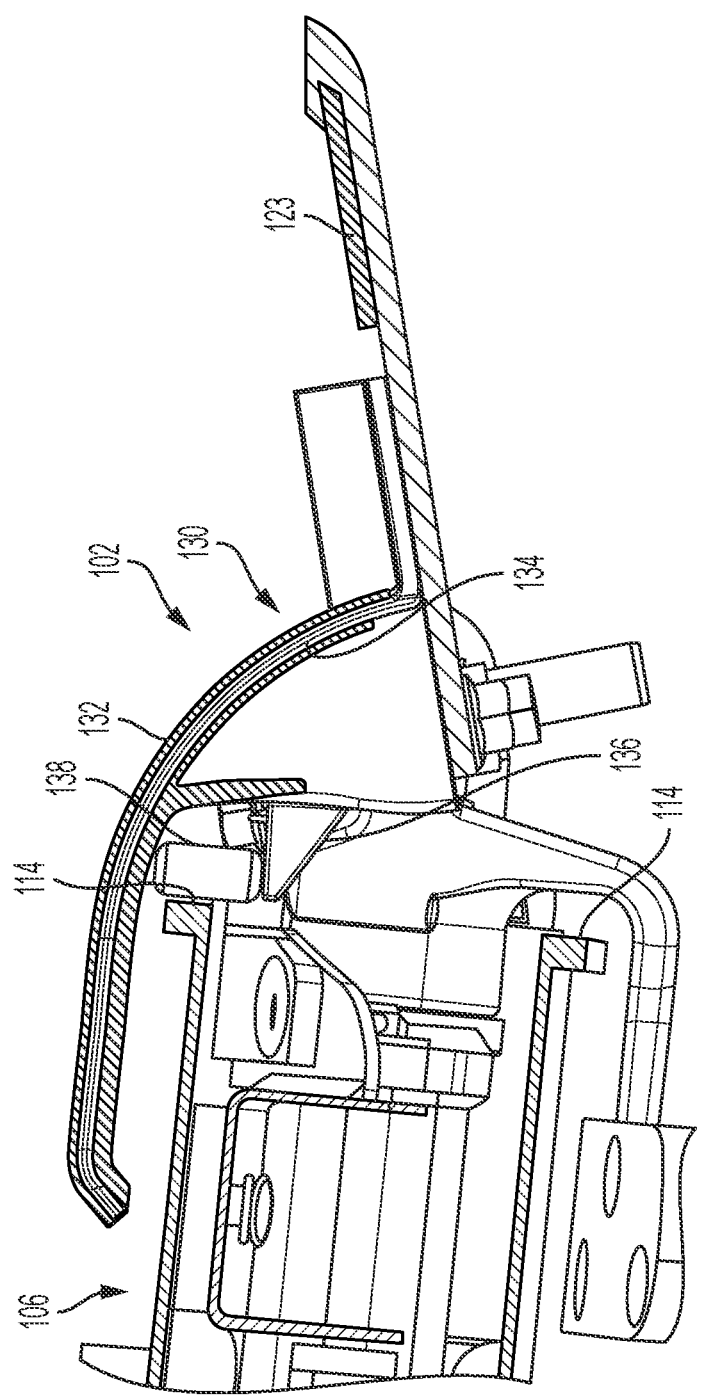
FIG. 2 is a cross-sectional view of taken along line II-II of FIG. 1 of a header equipped with a crop ramp in accordance with the subject disclosure.
Figure 3:
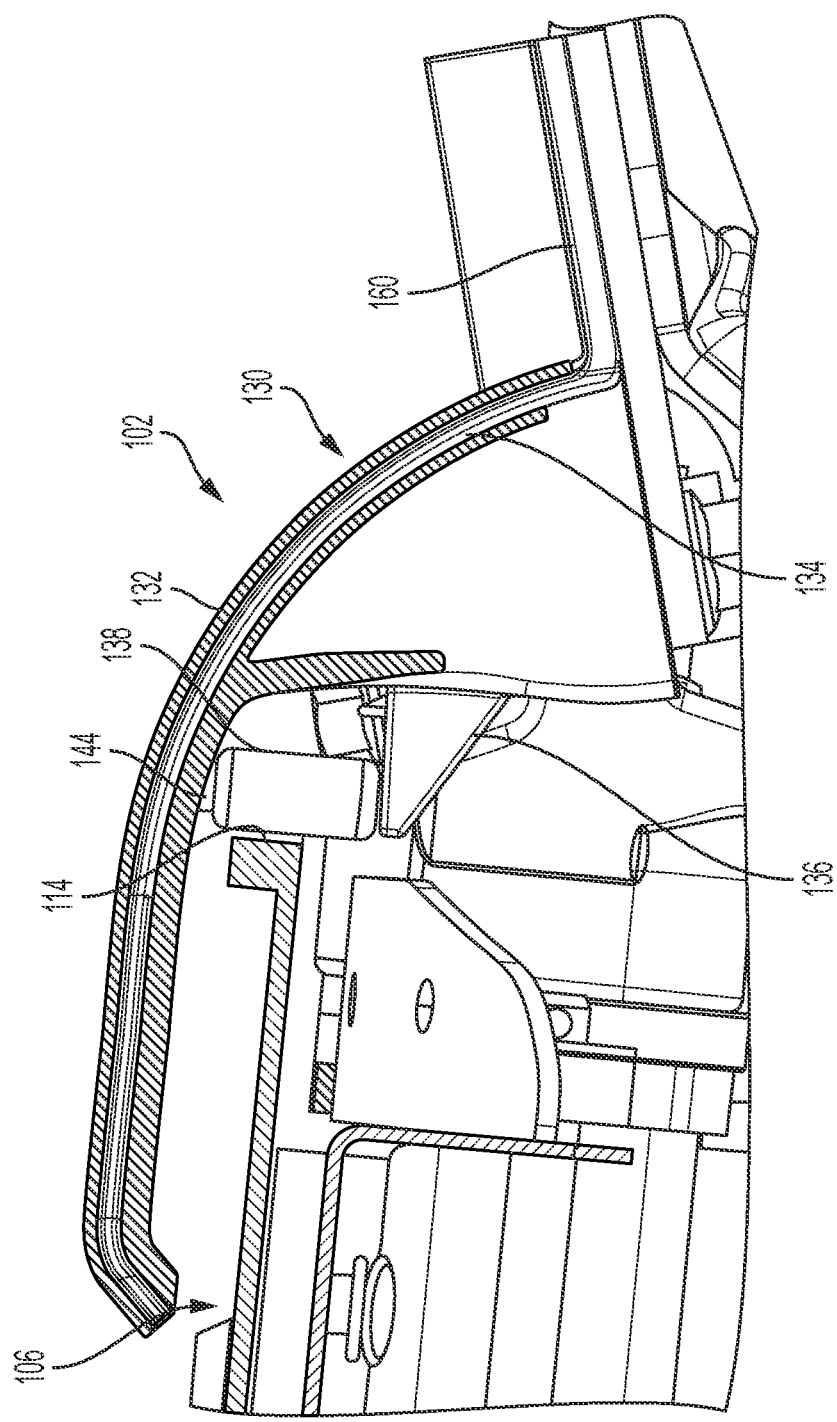
FIG. 3 is an enlarged view of a portion of FIG. 2.
Figure 4:
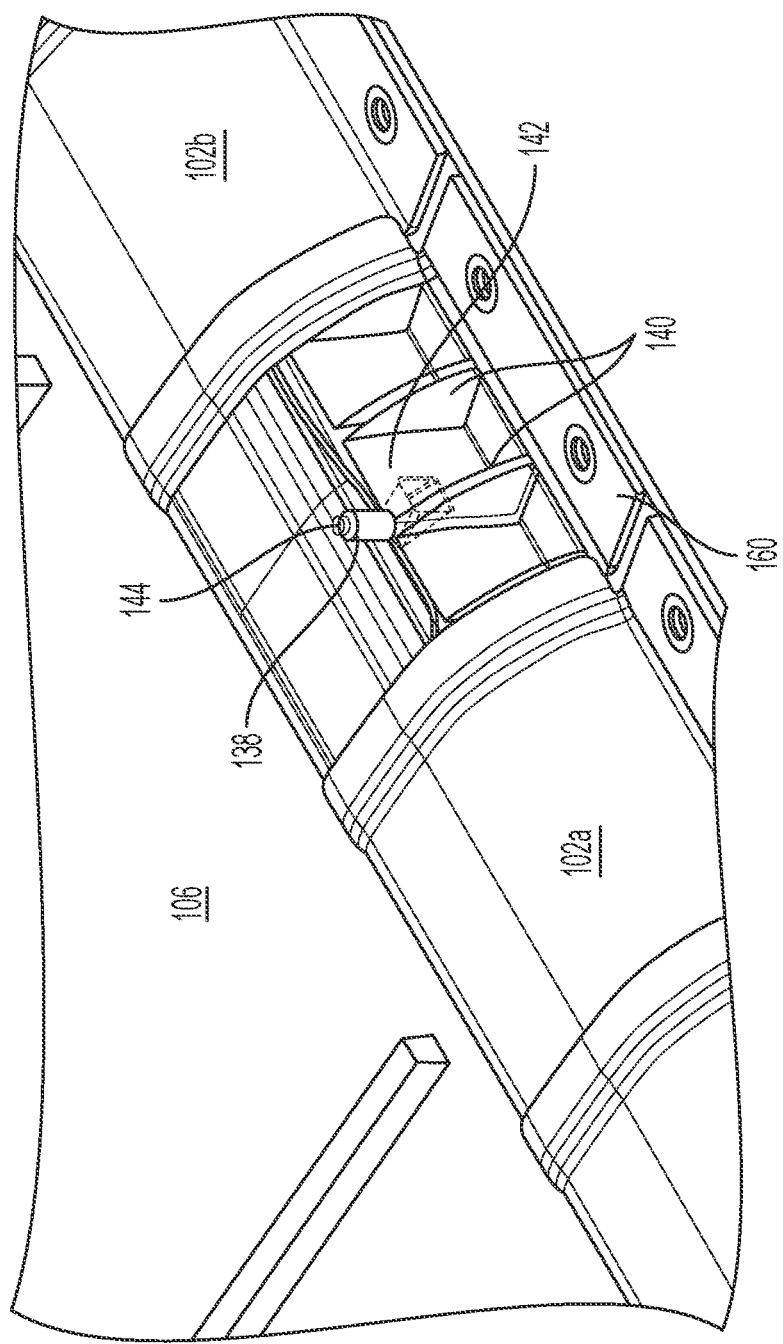
FIG. 4 is an enlarged perspective view of a crop ramp according to the subject disclosure with certain elements omitted for purposes of illustration.

Referring to FIGS. 2 and 3, the crop ramp 102 according to the subject disclosure includes a curved plate 130 having an outer surface 132 over which cut crop passes and an inner surface 134. The crop ramp further comprises a roller support 136 extending rearwardly from the curved plate and a roller 138 supported for rotation by the roller support. As shown in FIG. 4, the crop ramp 102 is preferably comprised of a plurality of crop ramp segments 102a, 102b, etc., any of which may be replaced in the event of excessive wear or other damage to a roller or other parts of a segment.

The curved plate 130 extends rearwardly over the roller 138 and the endless belt draper conveyor 106. In particular, a fore end of the curved plate is positioned below a top run of the endless belt conveyor and an aft end of the curved plate is positioned above the top run and inwardly of the top run relative to the fore end of the endless belt conveyor. In addition, the crop ramp 102 further comprises a substantially horizontal base plate 160 (FIGS. 2 and 3) connected to the curved plate. The substantially horizontal base plate 160 connects the crop ramp to the cutter bar assembly 110, e.g., the longitudinally extending knife guard 120 thereof.

The crop ramp 102 further comprises a gusset 140 provided on the inner surface 134. The roller support 136 may be affixed or releasably attached to the gusset. If affixed to the gusset, the roller support may be attached by any suitable fixed connection, e.g., the roller support may be molded or welded to the gusset. If releasably attached to the gusset, the roller support may be attached by any suitable releasable connection, e.g., the roller support may be fastened to the gusset by pins, rivets, nuts and bolts, or the like.

As shown in FIG. 4, according to an exemplary embodiment, the crop ramp 102 comprises a plurality of spaced apart gussets 140 and a plate 142 secured to rear edges of a pair of spaced apart gussets. In addition, as shown in FIGS. 2-4, the roller support 136 is secured to the plate 142. The roller support includes a spindle 144 about which the roller 138 rotates. The spindle and roller are attached to the plate and/or gusset such that they are in the same plane as the upper run of the endless belt conveyor.

The roller 138 extends upwardly from the roller support 136 adjacent and substantially perpendicular to a fore edge 114 of the endless belt conveyor, e.g., the roller is immediately adjacent an anterior face of the endless belt conveyor, and has a longitudinal axis transversing the curved plate 130. According to an aspect, the header 200 comprises a plurality of roller supports 136 and rollers 138. The roller(s) 138 each have an outer circumferential surface configured to be contacted by the fore edge 114 of an upper run of the endless belt draper conveyor 106 in order maintain substantially frictionless tracking of the conveyor and eliminate contact between the conveyor and the interior of the crop ramp, which contact could otherwise result in excessive wear or other damage to the endless belt conveyor 106 and/or the crop ramp 102.

It will be appreciated by those skilled in the art that changes could be made to the exemplary embodiments described above without departing from the broad inventive concept thereof. It is to be understood, therefore, that the subject disclosure is not limited to any particular exemplary embodiments disclosed, but it is intended to cover modifications within the spirit and scope of the subject disclosure as defined by the appended claims.

We claim:

1. A crop ramp for a header of an agricultural harvester comprising:
   a curved plate having an outer surface and an inner surface;
   a roller support extending rearwardly from the curved plate; and
   a roller supported for rotation by the roller support, wherein the roller support includes a spindle about which the roller rotates.

2. The crop ramp of claim 1, further comprising a gusset provided on the inner surface.

3. The crop ramp of claim 2, wherein the roller support is affixed to the gusset, molded to the gusset, or releasably attached to the gusset.

4. The crop ramp of claim 1, wherein the roller extends upwardly from the roller support.

5. The crop ramp of claim 1, wherein the roller has a longitudinal axis transversing the curved plate.

6. The crop ramp of claim 1, wherein the crop ramp comprises a plurality of spaced apart gussets.

7. The crop ramp of claim 6, further comprising a plate secured to rear edges of a pair of spaced apart gussets.

8. The crop ramp of claim 7, wherein the roller support is secured to the plate.

9. The crop ramp of claim 1, wherein the curved plate extends rearwardly of the roller.

10. The crop ramp of claim 1, further comprising a substantially horizontal base plate connected to the curved plate.

11. A header for an agricultural harvester comprising:
an endless belt conveyor having a fore edge and supported for movement on a frame of the header;
a cutter bar; and
a crop ramp disposed between the cutter bar and the endless belt conveyor, the crop ramp comprising:
a curved plate having an outer surface and an inner surface,
a roller support extending rearwardly from the curved plate, and
a roller supported for rotation by the roller support, wherein the roller extends substantially perpendicular to the fore edge of the endless belt conveyor.

12. The header of claim 11, wherein the roller is adjacent the fore edge of the endless belt conveyor.

13. The header of claim 11, wherein the roller is immediately adjacent an anterior face of the endless belt conveyor.

14. The header of claim 11, wherein the curved plate extends rearwardly over the roller and the endless belt conveyor.

15. The header of claim 11, wherein a fore end of the curved plate is positioned below a top run of the endless belt conveyor and an aft end of the curved plate is positioned above the top run of the endless belt conveyor.

16. The header of claim 11, further comprising a plurality of roller supports and rollers.

17. The header of claim 11, further comprising a cutter bar assembly connected to the crop ramp.

18. An agricultural harvester comprising the header of claim 11.

* * * * *